United States Patent Office

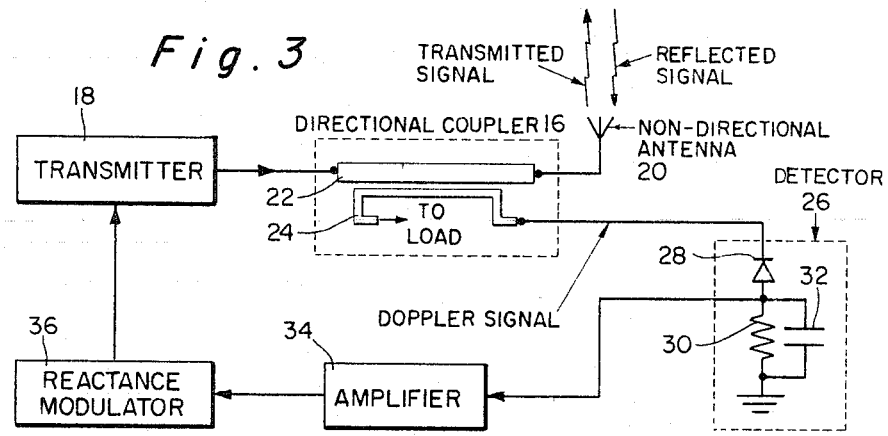
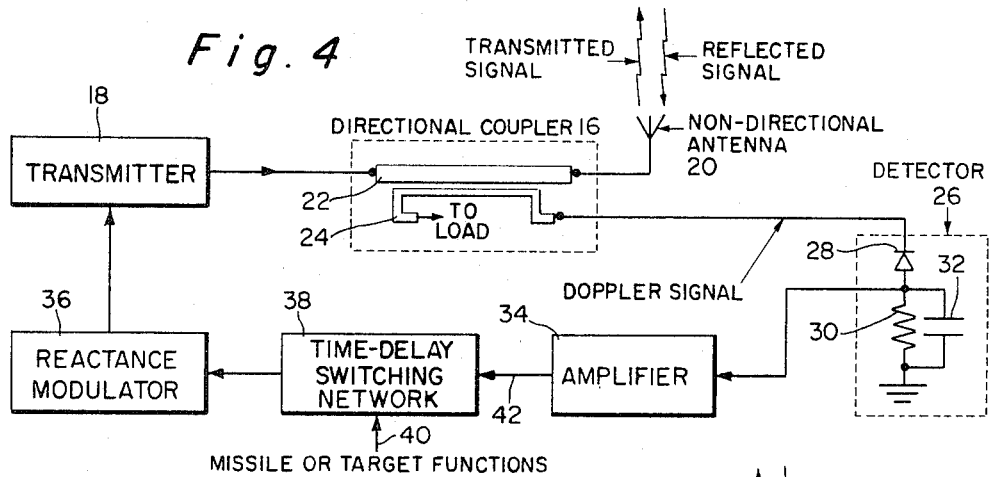
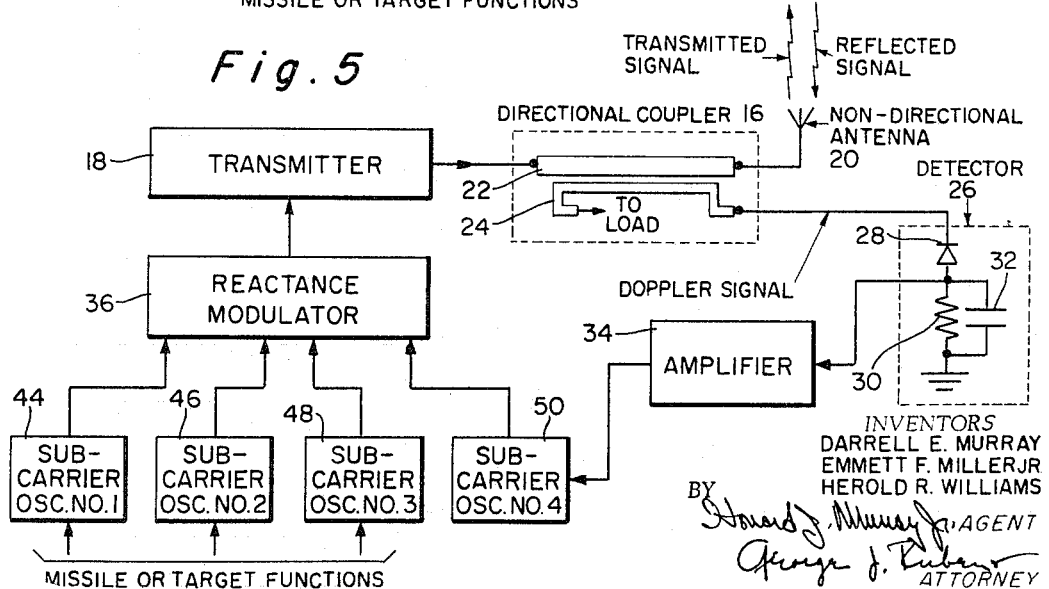

3,289,204
Patented Nov. 29, 1966

3,289,204
COMBINED MISS-DISTANCE INDICATOR AND TELEMETRY SYSTEM
Darrell E. Murray, 2605 3rd Ave., Scottsbluff, Nebr.; Emmett F. Miller, Jr., 1119 S. "L" St., Oxnard, Calif.; and Herold R. Williams, 520 Big Pine Drive, Virginia Beach, Va.
Filed Apr. 16, 1964, Ser. No. 360,461
5 Claims. (Cl. 343—7.5)

The invention described herein may be manufactured and used by or for the Government of the United States of America for governmental purposes without the payment of any royalties thereon or therefor.

The present invention relates to a Doppler radar system designed to measure the miss distance between an airborne target and a projectile which is launched with the intention of impacting such target.

In the testing and evaluation of missiles and rockets, there is a requirement for some device or apparatus which will yield information as to the accuracy of such projectiles when they are being tested with a view toward their subsequent use under actual combat conditions. A number of such so-called miss-distance indicators are now known, some of which are based upon acoustic principles, others of which incorporate optical components, while still others depend upon a measurement of the time required for electromagnetic energy to be transmitted between the target and the missile and then be reflected back to its point of origin.

Although the latter type of system has proven to be generally satisfactory in operation, nevertheless it imposes severe requirements on the apparatus employed. Because of limitations on size and weight, the system should incorporate a minimum number of components, and should be adaptable to a wide variety of vehicles, as well as providing useable information from missiles, rockets, satellites and other projectiles of different sizes and configurations operating over a wide range of speeds and under all conditions of weather and visibility. Furthermore, a satisfactory system should indicate the miss distance of a missile regardless of its direction of the approach to the target aircraft. Still further, the system should develop an output data signal suitable for transmission, processing and recordation by devices of conventional design. An additional but by no means final requirement is that its reliability must be sufficiently high so that dependence may be placed upon the data yielded thereby.

The basic principles of a standard Doppler radar system are well known, and the system has proven to be useful as a simple miss-distance indicator. The Doppler signals have a frequency proportional to the radial velocity of a missile relative to the intended target. If it can be assumed that the direction and velocity of the missile remain constant over short time intervals (and that the missile does not impact the target) then the Doppler beat frequency is high when the missile is at some distance from the target, decreases in frequency as the missile approaches, goes through "zero" frequency at the point of nearest approach, and then increases in frequency as the missile passes beyond the target. The resulting signal contains information as to the magnitude of the miss distance but not the direction from the target of the point of closest approach.

It has been found in practice, however, that Doppler radar systems of the type discussed above do not fully satisfy operating requirements, due primarily to the very small amount of energy which is reflected from the missile and picked up by the target aircraft. For example, the energy reflected from a missile under such conditions and picked up by the receiver on the target is usually less than the original transmitted energy by as much as 140 decibels. Such systems, moreover, are not completely free from "leakage" energy, and, in fact, the amount of such energy frequently exceeds the amplitude of the reflected signals, so that the latter are completely masked. This drawback may be overcome to a certain degree by employing separate transmitting and receiving antennas which are highly directive in nature. Furthermore, so-called balancing networks may be incorporated in the system to further reduce the effect of the leakage energy. However, directional antennas are highly restrictive in their nature since they only pick up energy reflected from a missile approaching the target from one direction. Antenna scanning systems complicate the equipment and must operate rapidly in order to be effective against missiles traveling at high speeds.

The omni-directional requirements of a satisfactory miss-distance indicator are best satisfied by the use of a single antenna for both transmitting and receiving. In one embodiment, the present concept has a basic feature thereof an antenna of this type, while at the same time its operation is integrated into that of a telemetry system by means of which information concerning the operating characteristics of the vehicle on which the antenna is installed is transmitted to a point where it may be instantly inspected or recorded for subsequent evaluation.

In accordance with a feature of the present concept, a miss-distance indicator is provided which is based upon the Doppler principle to yield information as to the effectiveness of a missile launched toward a target, and which in addition provides for the telemetering of the miss-distance data so obtained to a ground station or other receiving point where such information may be instantly inspected or, alternatively, recorded for subsequent evaluation. An outstanding characteristic of the herein-disclosed apparatus is that it is extremely simple in construction and adds very little weight to the vehicle on which it is carried. Still further and very importantly, the apparatus of the present invention is capable of measuring extremely short miss-distances, depending upon the operating frequency, in practice down to a few feet. Systems heretofore utilized for analogous purposes have not yielded comparable results due to the inability of the circuitry to respond to the minute time displacement between the transmitted and reflected signals, which, for close approaches of the missile to the target, are measured in microseconds.

One object of the present invention, therefore, is to provide an improved form of miss-distance indicator which is simple in construction and reliable in operation.

Another object of the invention is to provide a miss-distance indicator, operating upon the Doppler principle, which may be installed either upon the missile or upon the target aircraft, and which is capable of measuring extremely close missile approaches without requiring complex apparatus which, if utilized, would add to the size and weight of the vehicle on which such apparatus is installed.

A still further object of the invention is to provide a miss-distance indicator, designed to be installed either upon the missile or upon the target, and which combines the function of telemetering miss-distance information, either alone or in combination with data indicative of other operating characteristics of the missile or target, to a receiving point where such data may be made instantly available for processing.

Other objects, advantages, and novel features of the invention will become apparent from the following detailed description of the invention when considered in conjunction with the accompanying drawings, wherein:

FIG. 3 is a schematic presentation of a miss-distance determining unit constructed in accordance with a preferred embodiment of the present invention, and designed for installation either upon the missile of FIG. 1 or upon the target aircraft of FIG. 2;

Figure 6:
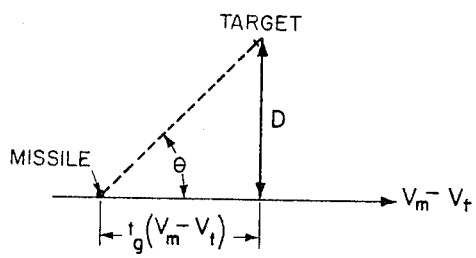
Figure 7:
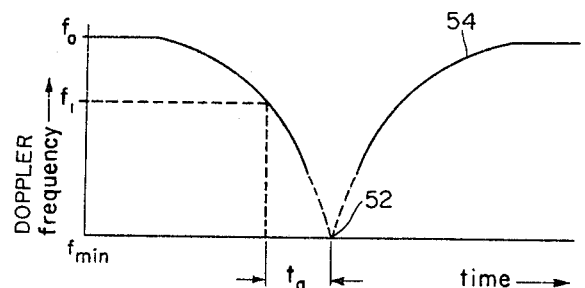

FIG. 4 schematically illustrates a modification of the miss-distance unit of FIG. 3, in which means are incorporated for transmitting data, during a predetermined period of time, with respect to certain operating functions of the vehicle upon which the apparatus is installed;

FIG. 5 schematically illustrates a further modification of the miss-distance-determining unit of FIG. 3, showing the manner in which the function of the unit as a miss-distance indicator is combined with a further function as a telemetering system to convey to a receiving point a continuous record of the functioning of one or more of the components of the missile or target upon which the unit is installed;

FIG. 6 is a vector diagram useful in explaining the geometrical principles upon which the present concept is based; and FIG. 7 is a graph illustrating the frequency versus time relationship of a typical example wherein a missile approaches a target, reaches a point of closest proximity thereto, and then recedes from the target vicinity.

Figure 1:
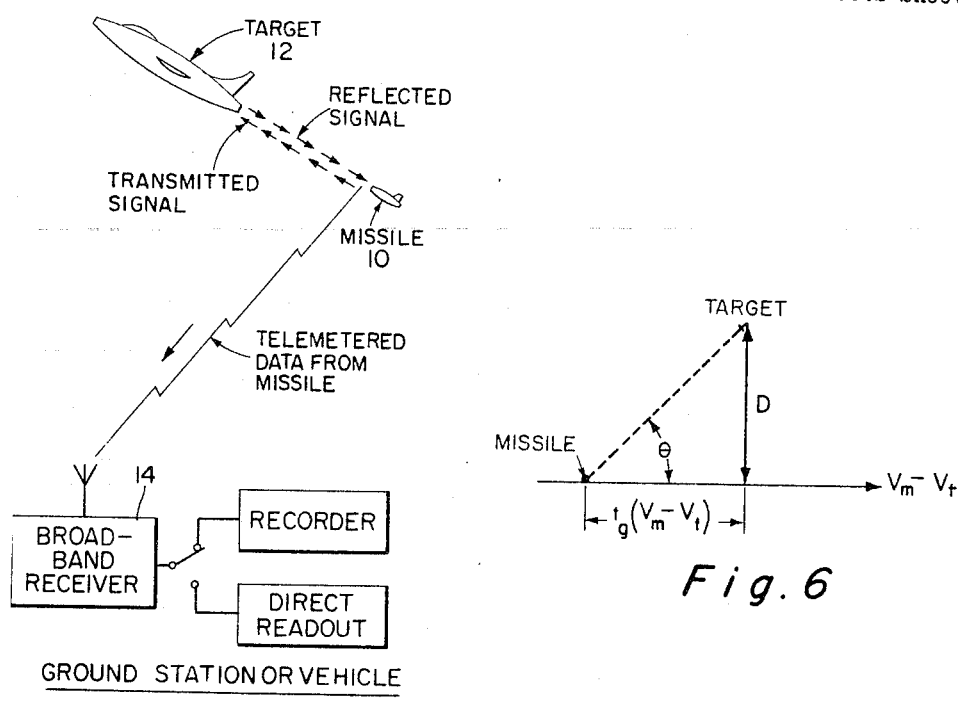
FIG. 1 is a schematic presentation illustrating the principle of operation of a preferred embodiment of the present invention, the miss-distance apparatus being installed on a missile launched with the intention of impacting a target aircraft.

Referring now to FIG. 1 of the drawings, there is illustrated one environment in which the present invention may be utilized. As shown, a missile or other projectile 10 has been launched with the intention of impacting a target aircraft, the latter being identified by the reference numeral 12. In order to evaluate the efficiency of the missile's guidance system, or the accuracy of the launching apparatus, it is desirable that, if no impact between the missile and target occurs, the actual distance by means of which the missile passes the target be ascertained. Systems now known are capable of yielding this information if the miss-distance is of considerable magnitude, but, due to their inherent limitations, they are ineffective when the missile passes in the immediate vicinity of the target. The apparatus of the present invention, to be subsequently described in detail in connection with FIGURES 3 through 7 of the drawings, is operative down to a range of only a few feet, and hence extends the capabilities of a miss-distance indicator beyond those which were previously accepted as limiting the extent of the information obtainable.

The system of FIG. 1 is based upon the well-known Doppler principle, wherein a transmitter carried by missile 10 generates a signal which is radiated from a non-directional antenna carried on the missile. This transmitted energy is reflected back from some object, in this case the target aircraft 12, and such reflected signal is picked up by the missile's antenna where it is combined with the generated signal to obtain a difference frequency. The phase relationship between the transmitted and reflected signals is a function of the distance over which the transmitted energy has traveled before being picked up by the missile's antenna following its reflection from the target. In order for this data to be made available for analysis, it is customarily telemetered to some remote point such as a receiver 14 located at a ground station or on some water- or airborne- or land-based vehicle, at which receiving point the telemetered information may be directly read out. Of course if desired such data may be recorded in any standard fashion for subsequent inspection and evaluation.

Figure 2:
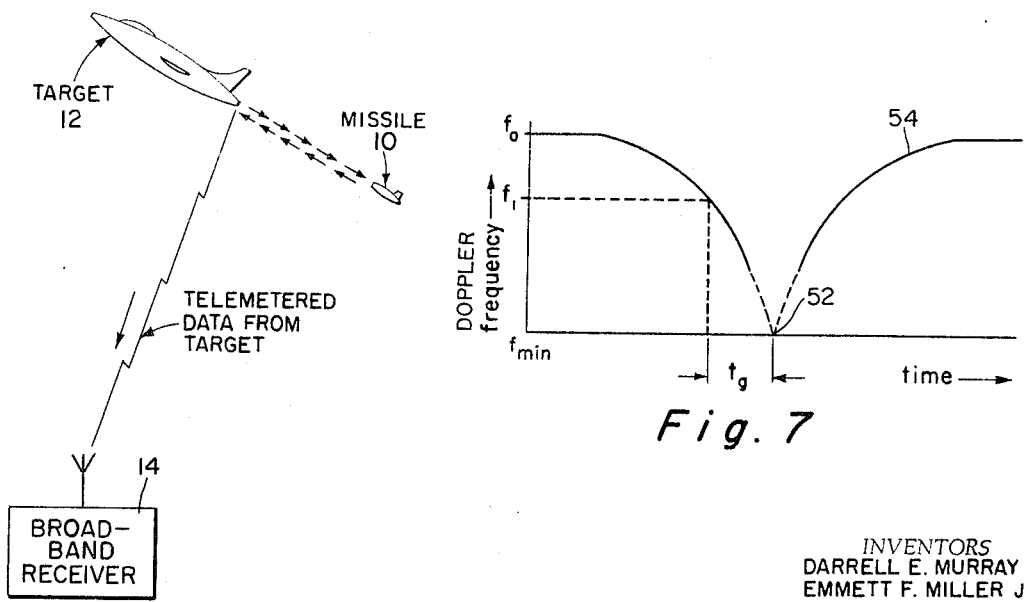
FIG. 2 is a schematic presentation of another embodiment of the present invention along the lines of FIG. 1, except that the miss-distance apparatus is installed in the target rather than on the missile.

Rather than to install the miss-distance indicator of the present invention on the missile itself, as called for by FIG. 1 of the drawings, it may alternatively be located on the target aircraft. Such an arrangement is shown in FIGURE 2, the radiated energy being reflected back to the target from the missile, and the data obtained as to the missile's proximity being telemetered to the receiver 14 from the target 12 in the same manner that the data was telemetered from the missile 10 in the embodiment of FIG. 1. The purpose of describing the alternative forms of the invention illustrated in FIGURES 1 and 2 is to point out that the miss-distance indicator of the present concept is equally adaptable to incorporation into the structure of the target, where the added weight thereof is not as serious a problem as it is when installed on a missile, where it may adversely affect the speed and maneuverability of the latter as well as reducing its maximum range.

FIG. 3 illustrates one preferred form of miss-distance indicator which may be carried by the missile 10 of FIGURE 1 or the target 12 of FIGURE 2. This indicator is intended to be constructed as a single compact unit, which includes as a principal component thereof a directional coupler generally identified in the drawings by the reference numeral 16. This member lies intermediate a conventional high-frequency transmitter 18 and a non-directional antenna 20 which not only radiates the energy developed by transmitter 18 but also act to receive energy returning to the unit after being reflected from an object. The antenna 20 may be of any form suitable for mounting on an airborne vehicle, such for example as a single dipole. It is only necessary that it serve both as a radiating element and as a receiver, the reason for which will become apparent as the present description proceeds.

The directional coupler 16 may be of known design, and operates to derive two separate signals which are mixed to yield a composite wave representative of the frequency difference between the separate signals so combined. In the device of FIGURE 3, a portion of the energy generated by transmitter 18 (which flows through the transmission line section 22) is inductively picked off by a second parallel line section 24 and enters a detector 26. Reflected energy received by the antenna 20 and also flowing through the transmission line section 22 is similarly picked off by the element 24 and fed to the detector 26. Consequently, the energy in the output of detector 26 is made up of portions of both the output of transmitter 18 and of the energy arriving at the antenna 20 after being reflected back from a distant object.

As shown in the drawings, the detector 26 includes a diode 28 (or other unidirectional conducting element) which is connected in series with the parallel combination of a resistor 30 and a capacitor 32. The component 28 acts in conventional fashion to rectify the signal output obtained from the directional coupler 16. The time constant of the R-C combination 30–32 is chosen so that the D.-C. signal output from the detector 26, as applied to an amplifier 34, is representative of positional variations between the missile 10 and target 12 of FIGS. 1 and 2 as the missile approaches the target, reaches a point of closest proximity thereto, and then recedes therefrom.

The amplifier 34 may be of any type which is suitable for increasing the amplitude of the signal from the detector 26. Although the degree of amplification required depends at least in part upon the efficiency of operation of the directional coupler 16 and on the signal-to-noise ratio of the system as a whole, it is only necessary that the amplifier output be adequate to operate a reactance modulator 36 the function of which is to vary the frequency of the transmitter 18 in accordance with changes in the D.-C. signal from detector 26.

It will now be appreciated that the rate of change in frequency of the transmitter 18 reflects the rate of change in the frequency of the Doppler signal, and this, in turn, is indicative of the distance by which the missile and target fail to impact one another. It should be recognized that one of the basic advantages inherent in a system such as set forth in FIG. 3 is that the rate of change in output frequency of the transmitter 18 is radiated from the antenna 20 to the ground station, and this transmitted signal contains the miss-distance information desired. It is only necessary that the broad-band receiver at such ground station include therein a conventional discriminator which acts to demodulate the received energy and derive data therefrom.

It may be desired in certain instances to be informed of the operation of one or more elements of the vehicle on which the system of FIGURE 3 is installed for a period of time prior to the actual launching thereof, and for a period immediately after launch of as long as, say, 3 or 4 seconds. There is no need for sending back miss-distance information during this pre-launch period and for a time immediately subsequent thereto, since the missile and target have not come into relative proximity. In accordance with the embodiment of the invention shown in FIGURE 4, means are provided whereby the miss-distance-developing portion of the system is disengaged from the transmitter during the period in question, so that the latter may be utilized for conveying to the ground station data concerning the functioning of one or more of the vehicle's sub-systems. This can be accomplished by incorporating in the arrangement of FIG. 3 a time-delay switching network 38 (which may take the form of a relay or electronic switch) and which is normally set to convey signals from a conductor 40 to the reactance modulator 36, these signals being representative of the operating status of some selected sub-system making up the missile or target. This switching network 38 is designed to be activated at the instant when the missile is launched, and to incorporate therein a predetermined amount of time delay, say, for example, 3 or 4 seconds. This enables the operating data appearing in conductor 40 to be supplied to the reactance modulator 36 for transmission from antenna 20 back to the ground station during the time that the missile is approaching the general vicinity of the target. At the expiration of this time interval, the switching network 38 operates to disconnect the conductor 40 from the system, and to replace it electrically with the conductor 42 which leads thereto from the amplifier 34. The system of FIGURE 4 then functions in a manner identical to that of FIGURE 3, and transmits the miss-distance information in the manner previously described.

It has been brought out above that the miss-distance indicator of the present invention functions secondarily as a telemetry system to provide information for evaluation at a ground station of the missile's or target's operating characteristics. In FIGURE 4 these two operations were performed sequentially, that is, the system was utilized for the transmission of missile or target functioning data alone for a given period of time, following which the system was utilized solely as a telemetry miss-distance indicator. In some circumstances, however, it may be either desirable or necessary to convey both types of information simultaneously rather than sequentially. One apparatus for carrying out such an objective is set forth in FIGURE 5 of the drawings. In this figure, the system of FIGURE 3 is modified by adding a plurality of sub-carrier oscillators, the number of which is chosen in accordance with the number of missile or target functions the transmission of which is desired. In FIGURE 5, the number of oscillators is selected as four, three of which are employed to provide sub-carriers for vehicle operating data sent out from transmitter 18, and the fourth of which receives the Doppler signal from the amplifier 34 of FIGURE 3. Each of the three "data" oscillators 44, 46 and 48 is chosen to have a sub-carrier frequency which is different from that of each of the other oscillators, and also different from the frequency of the oscillator 50 to which the Doppler signal is applied. The output of each of the oscillators 44, 46, 48 and 50 is fed to the transmitter 18 so that the output of the latter (as transmitted from antenna 20) contains four sub-carriers each of which carries thereon a particular modulation representative either of a specific missile function or the miss-distance signal developed as above brought out.

In FIG. 6 of the drawings is set forth a vector diagram of the geometrical principles upon which the present concept is based. Let it be assumed that:

$f_o$ = the steady-state Doppler signal, or in other words, the signal received at a given instant of time when the missile and target are separated by a considerable distance
$\lambda$ = the transmitter wave length
$V_m$ = the missile velocity
$V_t$ = the target velocity
$\theta$ = the "look" angle.

With the above definitions in mind, let it be further assumed that the missile $m$ is at that point in space where the Doppler frequency has decreased to 0.707 of $f_o$, this particular value of Doppler frequency being designated as $f_1$. Let it be further assumed that $t_g(V_m - V_t)$ is the distance traveled during the time that the Doppler frequency is decreasing to zero from this value $f_1$.

Now, at a given instant of time $$f_o = 2 \frac{(V_m - V_t)}{\lambda}$$

and $$f_1 = f_o \cos \theta$$

Since, from FIGURE 6, $\theta$ represents the "look" angle, then $$\tan \theta = \frac{D}{t_g(V_m - V_t)}$$

Solving the above equation for D, the required miss distance, and assuming the condition when the angle $\theta = 45°$ and the tangent of this angle is consequently equal to 1, $$D = \tan \theta \cdot t_g(V_m - V_t)$$

from which, as an example, where $t_g$ (the time during which the Doppler frequency decreases from $f_1$ to 0) is .025 sec. and the quantity $(V_m - V_t)$ is 800 ft. per second, $$D = 1 \cdot .025 \cdot 800$$

or $$D \cong 20 \text{ feet}$$

which is the miss distance required.

The performance of the system set forth can be represented graphically by the curve of FIG. 7, which illustrates the result of an actual operation conducted under conditions corresponding to those described above. As can be seen in this figure, the Doppler frequency, plotted as a function of time, decreases sharply after it has reached a value $f_1$ equal to 0.707 of its steady-state magnitude ($f_o$), and reaches a minimum at a time instant separated from the time instant when $f_1$ is so reached by an amount equal to $t_g$. It is at this point, represented by the reference numeral 52 in the drawing, that the missile and target are at their point of closest approach. The Doppler frequency then increases in amplitude as brought out by the curve portion 54. One of the desirable characteristics of the present concept is that this variation in Doppler signal output is quite sharp or pronounced at the critical instant, and consequently its detection and measurement is greatly facilitated even though conventional receiving apparatus is employed for this purpose.

Obviously many modifications and variations of the present invention are possible in the light of the above teachings. It is therefore to be understood that within the scope of the appended claims the invention may be practiced otherwise than as specifically described.

We claim:
1. A system for yielding information as to the miss distance between a target and a projectile launched with the intention of impacting such target, said system comprising:
- a variable-frequency transmitter;
- an antenna;
- a transmission line connecting said transmitter to said antenna, said transmission line including means for sampling a backward wave traveling in said line from said antenna toward said transmitter along with a portion of the transmitted energy;
- circuit means, including means for deriving a Doppler signal, for coupling said sampling means to said transmitter to change the operating frequency thereof in accordance with the output of such sampling means;
- whereby, when energy is radiated from said antenna and reflected back thereto, such reflected energy will create a backward wave in said transmission line which will be picked off together with said transmitted energy by said sampling means and applied as a Doppler signal to said transmitter to modify the operating frequency thereof as a function of changes in the output of said sampling means.

2. The combination of claim 1, in which said transmitter and said antenna are both carried by said target, and the backward wave appearing in said transmission line results from the reception by said antenna of energy which has previously been radiated thereby and which has been reflected back thereto from said projectile.

3. The combination of claim 1, in which said transmitter and said antenna are both carried by said projectile, and in which the backward wave developed in said transmission line results from the reception by said antenna of energy which has previously been radiated thereby and which has been reflected back thereto from said target, such backward wave being mixed with the output of said transmitter to develop a difference frequency, the rate of change of which is representative of the miss distance between said projectile and said target as the former approaches the latter, reaches a point of closest proximity thereto, and then recedes therefrom.

4. In an apparatus for determining the distance by which a first vehicle launched toward second vehicle fails to impact the latter, and for additionally telemetering to a remote point not only such miss-distance information but also data as to the functioning of one or more components of that particular one of said vehicles upon which the apparatus is installed, the combination of:
- a transmitter carried by one of said vehicles and normally operating at a predetermined frequency;
- an antenna also carried by said one vehicle and adapted to not only radiate the energy developed by said transmitter but also to receive energy;
- means including a directional coupler, connecting said transmitter to said antenna so that the latter radiates the output of said transmitter; and
- a feedback circuit, including the series combination of a detector, a modulator, and a time-delay switching network, connecting said directional coupler to said transmitter;
- said time-delay switching network being adapted to selectively receive not only the output of said detector but also data as to the status of one or more components of said one vehicle, with the output of said switching network being applied through said modulator to said transmitter;
- said time-delay switching network being initially receptive to the said component status data for a predetermined interval of time, following the expiration of which interval said switching network is no longer receptive to said component status data, but becomes instead receptive to the output of said detector, the latter containing the difference frequency between the output of said transmitter and the energy received by the antenna after such energy has been reflected back to said one vehicle from said second vehicle, the rate of change of said difference frequency varying as a function of the miss distance separating said two vehicles.

5. In a system for performing the dual functions of determining the distance by which a first vehicle launched toward a second vehicle fails to impact the latter, and also for telemetering to a remote point data as to the operating status of at least one component of that particular one of said vehicles upon which such apparatus is installed, the combination of:
- a transmitter installed on one of said vehicles and having a normal predetermined frequency of operation;
- a transmit-receive antenna, both said transmitter and said antenna being mounted on said one vehicle;
- a transmission line connecting said transmitter to said antenna, said transmission line incorporating pick-off means for deriving a signal representative of the difference frequency between the transmitted signal and the energy picked up by said antenna after such energy has been radiated from the antenna and reflected back thereto from said second vehicle, the difference in frequency between the transmitted signal and the wave passing through the transmission line from the antenna toward said transmitter constituting the Doppler frequency, the rate of change of which is representative of the miss distance between said two vehicles;
- a plurality of sub-carrier oscillators;
- a circuit, including one of said sub-carrier oscillators, for applying the output of said pick-off means to said transmitter to change the frequency of the latter in accordance with changes in the said Doppler signal;
- each of the remaining sub-carrier oscillators being adapted to respectively receive data as to a particular operating function of said one vehicle; and
- means for applying the respective outputs of said remaining oscillators to said transmitter to develop a plurality of sub-carriers equal in number to the number of said oscillators, and on which respective sub-carriers the said vehicle operating data is radiated from said antenna along with the mis-distance information appearing as modulation on that particular sub-carrier generated by said one oscillator.

References Cited by the Examiner
UNITED STATES PATENTS

| | | | |
|---|---|---|---|
| 2,908,888 | 10/1959 | Kirkland | 343—8 X |
| 3,088,697 | 5/1963 | Cutler | 343—7 X |
| 3,113,306 | 12/1963 | Gardner | 343—8 X |
| 3,205,494 | 9/1965 | Robert et al. | 343—12 |

OTHER REFERENCES

Reich, H. J. et al.: Microwave Principles, N.J., D. Van Nostrand, 1957, page 76 relied on.

CHESTER L. JUSTUS, *Primary Examiner.*

T. H. TUBBESING, *Assistant Examiner.*